Dec. 29, 1953 W. L. PARKER 2,664,097
ROTATING SPOOL SERVO VALVE
Filed Jan. 8, 1951 3 Sheets-Sheet 1
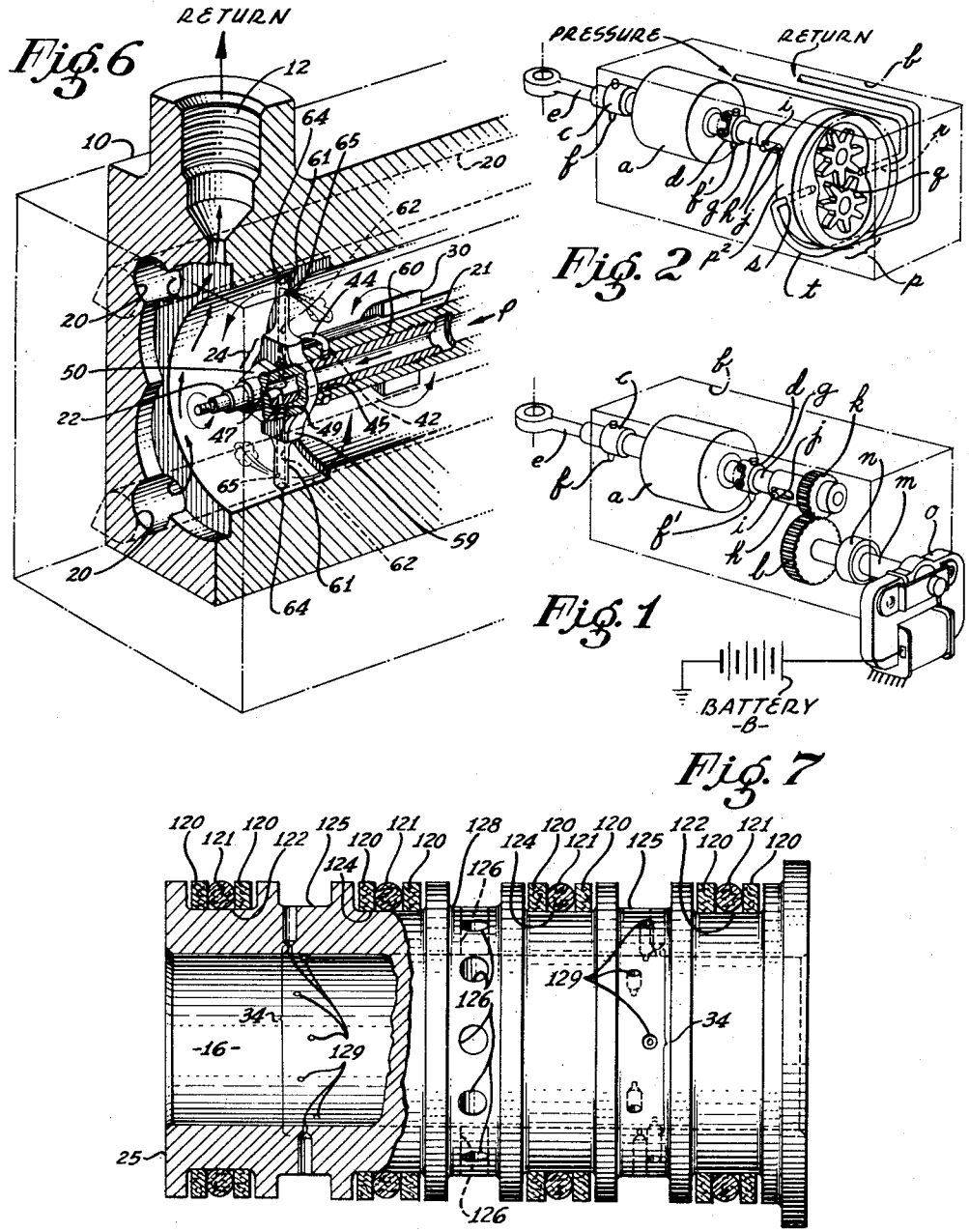
INVENTOR:
WARDE L. PARKER
By Herbert E. Metcalf
HIS PATENT ATTORNEY Dec. 29, 1953   W. L. PARKER   2,664,097
ROTATING SPOOL SERVO VALVE
Filed Jan. 8, 1951   3 Sheets-Sheet 2
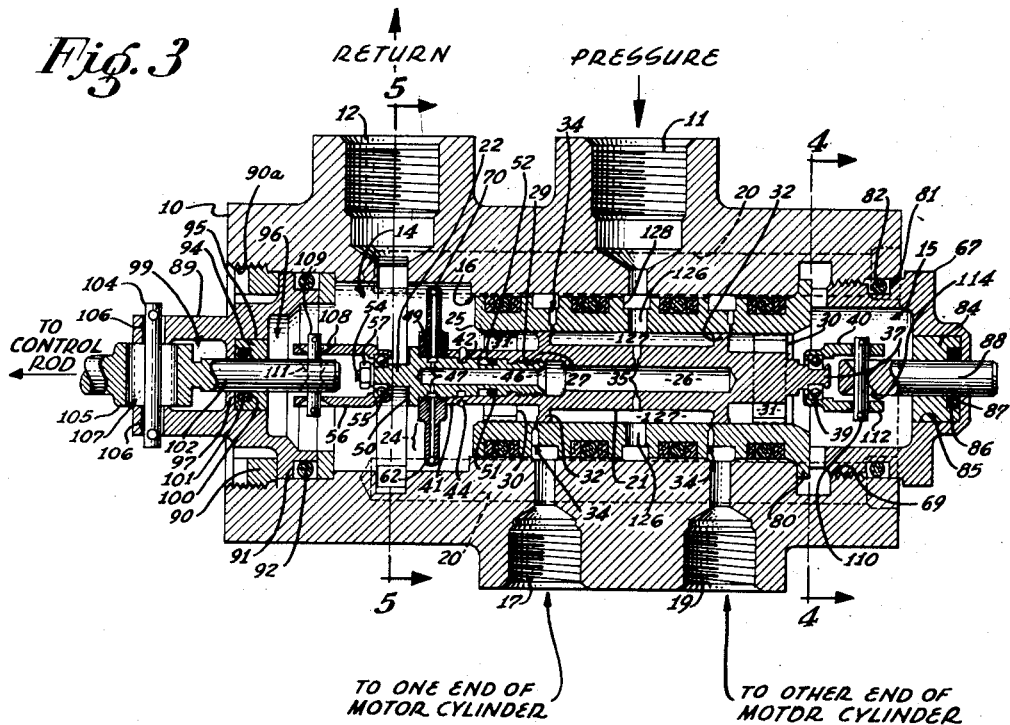
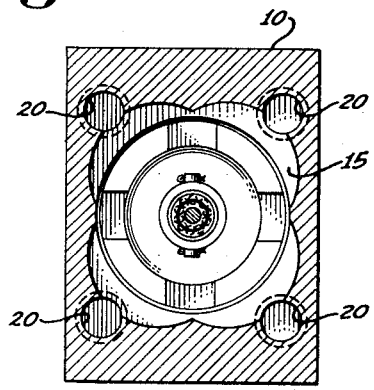
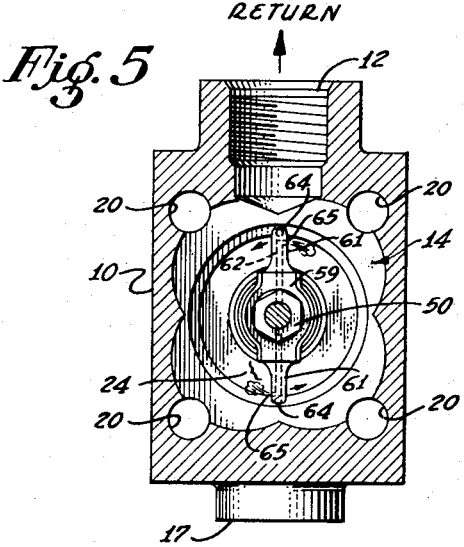
INVENTOR:
WARDE L. PARKER
By Herbert E. Metcalf
HIS PATENT ATTORNEY Dec. 29, 1953     W. L. PARKER     2,664,097
ROTATING SPOOL SERVO VALVE
Filed Jan. 8, 1951     3 Sheets-Sheet 3
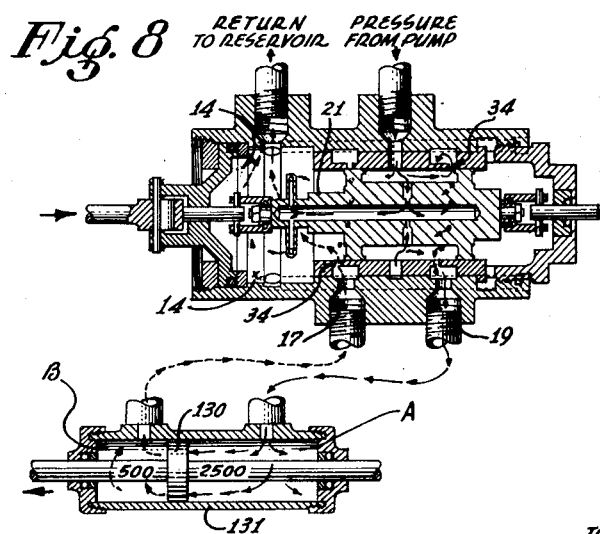
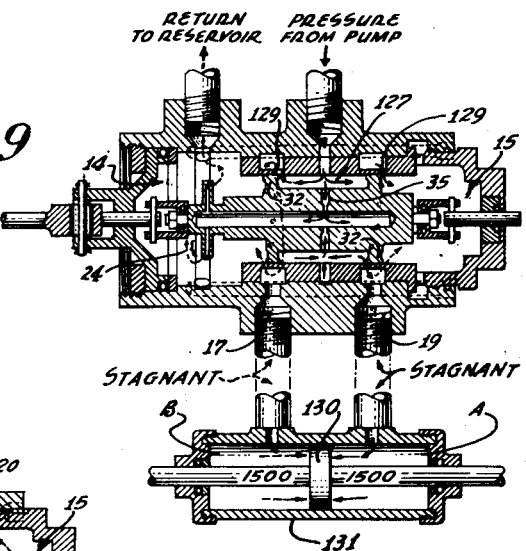
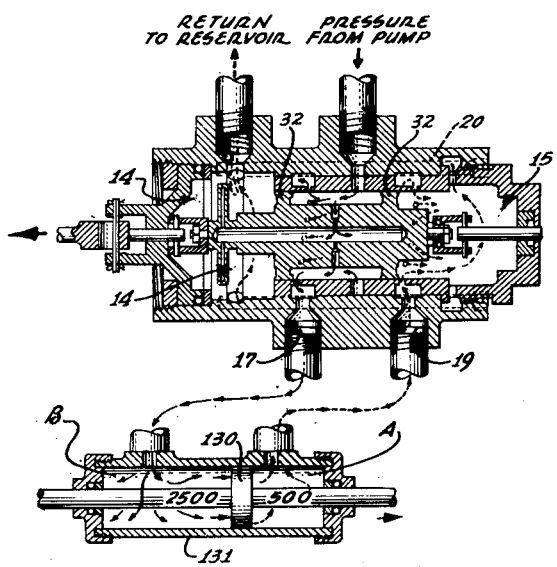
INVENTOR:
WARDE L. PARKER
By Herbert E. Metcalf
HIS PATENT ATTORNEY Patented Dec. 29, 1953

2,664,097

UNITED STATES PATENT OFFICE 2,664,097

ROTATING SPOOL SERVO VALVE

Warde L. Parker, Los Angeles, Calif., assignor to Northrop Aircraft, Inc., Hawthorne, Calif., a corporation of California Application January 8, 1951, Serial No. 204,978

1 Claim. (Cl. 137—332)

This invention relates to controls for hydraulic motors, and more particularly to a hydraulic valve as used in a system ideally suitable for full power operation of aircraft control surfaces under pilot control of the hydraulic motor valve in the system.

The trend in aircraft design is to larger, faster, and more powerful aircraft. Control surface loads have increased, and in many cases it has been desirable to resort to full power operation of the control surfaces as by the full powered hydraulic flying control system as described, for example, in U. S. application, Serial No. 23,567, filed April 27, 1948, now abandoned. The F-89 U. S. Air Force jet-propelled fighter aircraft, for example, has such a full powered control system operated entirely by hydraulic power under pressure of 3,000 p. s. i.

Means for controlling the flow of hydraulic fluid by means of sleeve and spool valve assemblies, suitable for use in aircraft control systems, are shown, described and claimed in U. S. application, Serial No. 17,624, filed March 29, 1948 by Parker, now Patent 2,631,571, and in U. S. application, Serial No. 123,375, filed October 25, 1949 by Strayer, now Patent 2,612,372, wherein hydraulic pressure fluid is metered through channels arranged to provide a predetermined flow portion by movement of an internal valve spool which is axially displaced by push-pull movement of control rod in response to manual operation by the pilot of the aircraft.

Servo valves of the type described above have proved highly satisfactory, particularly in connection with attitude control surfaces. Certain flying controls, however, are in use on current aircraft, these controls being of a type which are set and maintained for certain periods of time at predetermined angles of attack. One of these controls, the dive brake for example, may be set at a certain angle and maintained there for substantial periods of time while subjected to severe aerodynamic stresses during high speed flight. The same conditions apply when an attitude control surface is moved away from aerodynamic neutral and maintained away from neutral for prolonged periods for trimming purposes. Under such conditions in servo valves of the general type referred to, there may be a tendency to build-up a binding force in the valve such that the pilot is required to exert an increasingly greater effort to displace the valve spool in the servo valve. Normally, in full power systems, the valve spool is controlled by the pilot through cables deliberately made as light as possible to handle only normal valve spool friction plus a small safety factor. Ordinarily the spool friction value is on the order of only 1.5 pounds.

It has been found, however, that under certain load conditions of the control system maintained for extended periods, the spool friction value may rise to a point where thirty pounds or more may be required to move it. When the pilot is required to operate a servo valve wherein the force has increased to thirty pounds, for example, undesirable operating handle load and cable stretch will result. When the valve spool finally moves, under the abnormal force condition, the spool moves beyond the limit desired and over-controls the control surface actuated by the system. Over-control of any control surface can, of course, be highly undesirable.

The exact reason for the build-up of the binding forces in the valve is not at present fully known, but many experimental tests have shown that with valves such as described herein and in the applications cited above, spool movement forces can rise from a normal of 1.5 pounds to over thirty pounds in time periods on the order of fifteen minutes, with a source pressure of 3,000 p. s. i.

It is, therefore, one of the objects of the present invention to provide a servo valve ideally suitable for use in connection with a hydraulic motor cylinder operating an airplane control surface, for example, which will have a pilot operating force of substantially uniform value at all times, and under all surface loads even if prolonged.

Another object of the present invention is to provide means for preventing the increase of binding forces in a servo valve that may occur during conditions where the binding forces in the valve would normally tend to increase.

Other objects will become more apparent as the description continues.

Briefly, the invention includes a hydraulic valve of the general type shown, described and claimed in the applications cited above, suitable for operation, for example, of a servo motor connected to move an airplane control surface under aerodynamic loads. The valve, operated by the pilot by a push-pull motion of the valve spool, is provided with means for continuously rotating the valve spool and the present invention is primarily concerned with the provision of an improved valve structure of the kind described. Preferably, the means for rotating the valve spool is a hydraulic motor, and also it is preferred to place this motor inside the valve casing so that the seal between spool and casing will not wear or produce rotating friction. With the motor located within the valve casing, the energy for spool rotation is conveniently obtained by utilizing a part of the energy contained in the hydraulic fluid supplied under pressure to the valve for operation of the controlled hydraulic motor.

The present invention will be more clearly understood by reference to the drawings, in which:

Figure 1 is a simplified diagrammatic view in perspective of a valve with the spool rotated by an electric motor.

Figure 2 is a simplified diagrammatic view in perspective of a valve with the spool rotated by a hydraulic motor of the gear type.

Figure 3 is a longitudinal sectional view showing one preferred form of the present invention with the valve spool in neutral position.

Figure 4 is a cross-sectional view as indicated by line 4—4 in Figure 3.

Figure 5 is a cross-sectional view as indicated by line 5—5 in Figure 3.

Figure 6 is a somewhat diagrammatic cutaway view in perspective of a preferred rotating valve spool motor.

Figure 7 is a side view of the valve sleeve partially cut away to show the metering flow hole pattern.

Figure 8 is a somewhat schematic longitudinal sectional view of the rotating spool valve connected to a hydraulic motor cylinder with the spool at one end of its stroke.

Figure 9 is a somewhat diagrammatic longitudinal sectional view with the spool in neutral position.

Figure 10 is a somewhat diagrammatic longitudinal sectional view with the spool at the other end of its stroke.

First, the hydraulic control valve of the specific construction shown in detail in Figure 3 is very schematically shown in the simplified views in Figures 1 and 2 with details of the valve spools and casings being omitted to merely demonstrate two ways in which continuous rotation of a valve spool in a valve casing can be carried into effect. In Figure 1, a valve spool $a$ is slidably enclosed in a valve body $b$ positioned between two end bearing couplings $c$ and $d$ which allow the spool $a$ to freely rotate while being moved axially by a push-pull control rod $e$ attached at one end of the valve body $b$, hereinafter called the forward end, to the end bearing coupling $c$ and locked therein by means of a front pin $f$. At the other end of the spool $a$, hereinafter called the rear end, an idler rod $g$ is fastened into the end bearing coupling $d$ by rear pin $f'$ and extends into a hollow shaft $h$ and is slidably fastened therein by a rod pin $i$ extending through the idler rod $g$ into an elongated slot $j$ in the shaft $h$. The shaft $h$ is provided with a gear $k$ at the outer end thereof, which meshes with another gear $l$ on a power shaft $m$ which passes through a seal $n$ in the valve body $b$ and into an electric motor $o$, for example. Operation of motor $o$, connected to power supply B, will rotate the valve spool $a$ without interfering with the axial movement of the spool $a$ in the valve casing $b$. Such rotation is to be performed continuously during the use of the valve so that the force required to move the spool in the casing for fluid control purposes will remain constant at all times.

Under certain conditions, such as long flights of the airplane, the valve may be in use for many hours. Under these circumstances, to avoid excessive wear on seal $n$ due to the continuous rotation of power shaft $m$, it may be desirable to place the motor inside casing $b$ and thus avoid such seal wear.

Figure 2 shows the installation of a hydraulic motor $p$, which is mounted within the valve body $b$. The spool $a$ is positioned between two end bearing couplings $c$ and $d$, the same as in Figure 1. The idler rod enters a hollow shaft $h$ and is slidably fastened therein by means of a pin $i$ extending through its section into an elongated slot $j$. The shaft $h$ enters the motor housing $p^2$ formed within valve body $b$ and connects to the gear assembly $q$. Pressure fluid enters the motor $p$ at an inlet $r$ and the fluid is exhausted by outlet $s$ and return line $t$. As will be brought out later, it is convenient to take fluid under pressure to operate the motor $p$ from the same source as is to be controlled by movement of spool $a$ and return the exhausted fluid to the same return line as used by the valve. Such an arrangement is shown in preferred form and in detail in Figures 3–10.

In Figure 3, a valve body 10 is provided with a pressure fluid inlet 11, a fluid outlet 12, a left return chamber 14 and a right return chamber 15 connected by a smooth valve body bore 16, and cylinder operating ports 17 and 19. Four diagonally opposed longitudinal fluid return passages 20 (best shown in Figures 4 and 5), enter valve body 10 at the right end thereof, intersecting right return chamber 15 as they pass therethrough and continue axially through valve body 10, intersecting and terminating slightly beyond left return chamber 14, returning fluid to chamber 14 from return chamber 15. Return chambers 14 and 15 are each counter-bored at diagonally opposed points to form a somewhat quatrefoil shape with each leaf element intersecting the adjacent return passage 20.

Again referring to Figure 3, a rotatable valve spool assembly, including a valve spool 21, connecting bolt 22, and a reaction type jet motor assembly 24, is slidably enclosed in a valve sleeve 25 which will be described later.

The valve spool 21 has a center bore 26 entering one end thereof, running axially through its section and terminating approximately midway between the center of the spool 21 and the opposite end. The spool bore 26 has a threaded portion 27 adjacent the left end thereof, adapted to screw onto the threaded end 29 of the connecting bolt 22. A balancing land 30 is provided at each end of the spool 21, contacting the inner surface of the valve sleeve 25 and acting to longitudinally support the spool. Return fluid is admitted to the return chambers 14 and 15, upon its return from the operating ports 17 and 19, through a number of opposed slots 31 spaced around the periphery of the balancing lands 30. Inwardly from each balancing land 30 and toward the center of the spool 21, metering lands 32, precision ground to match the sleeve cylinder surface, are provided to progressively uncover a number of metering flow holes 34 in the valve sleeve 25 as the spool 21 is axially displaced in response to push-pull movement of a control rod (not shown) and will be described later. A pair of opposing pressure ports 35 are bored transversely through the wall of the valve spool 21, midway between the metering lands 32, to direct a portion of the incoming pressure fluid into the spool bore 26.

The spool 21 terminates at its right end with a spindle 37 adapted to enter a ball bearing 39 contained in an end bearing coupling 40 and extend therethrough. The end of the spool spindle 37 is then peened over, increasing the diameter thereof, retaining the spindle 37 in the end bearing coupling 40 while allowing the free rotation of the valve spool 21 therein.

An outer circumferential groove 41 in the spool 21 is provided adjacent the left end thereof and is positioned to exactly cover and align itself with a circumferential groove in the connecting bolt 22. A lockwire 44 is retained in the spool groove 41, having a small portion of one end bent inwardly and projecting through a small bore 42 in the spool groove 41 engaging the groove 45 provided on the connecting bolt 22, locking the two units together, thus preventing their becoming unscrewed during rotation. An axial bore 46 enters the right end of the connecting bolt 22 and forms a chamber which connects with the spool bore 26. Two opposed orifices 47 extend through the wall of the connecting bolt 22, adjacent the left end thereof, into an outer peripheral fluid groove 49 on the connecting bolt 22. A hexagon collar 50 is provided on the connecting bolt 22 adjacent the fluid groove 49 to abut, position and retain the jet motor 24 against the left end of the valve spool 21 when the jet motor 24, connecting bolt 22, and spool 21 are assembled in the valve body 10. A packing seal groove 51 and an O ring seal 52 retained therein extends around the outer periphery of the connecting bolt 22 about midway between the ends thereof, preventing leakage between the spool 21 and the connecting bolt 22. A threaded spindle 54 at the left end of the connecting bolt 22 is adapted to pass through a ball bearing 55 contained in an end bearing coupling 56, and receive a lock nut 57.

It should be noted that the bearings 39 and 55 are preferably held as small as allowable by the load requirement, and are provided to minimize frictional drag which should be overcome by the jet motor 24.

The valve spool 21 is thus rotatably positioned in ball bearings between the two end bearing couplings and can rotate freely, irrespective of axial movement of the spool.

The jet motor 24 (see Figures 5 and 6) is provided with a central body 59 having an axial center bore 60 adapted to press fit onto the connecting bolt 22 and abut the hexagon collar 50. A pair of opposed arms 61 extend outwardly, and in line, from the jet body 59 perpendicular thereto, having central fluid passages 62 entering the center bore 60 of the body 59.

When the jet motor 24 is positioned on the connecting bolt 22, the fluid passages 62 in the jet arms 61 connect at the basal ends thereof with the fluid groove 49 around connecting bolt 22 and orifices 47. Fluid is thereby directed through the connecting bolt orifices 47 into the fluid groove 49 and out the jet arm passages 62.

The terminus of each arm 61 is sealed with a metal ball 64 silver soldered in place. A transverse jet bore 65 is bored at right angles to the passage in each arm 61 and at right angles to center bore 60 of the jet body 59; the jet bore of one arm diametrically opposing the jet bore in the other arm so that when the stream of pressure fluid is ejected from one arm 61 clockwise the stream of pressure fluid ejected from the opposite arm will be directed counter-clockwise, the reaction thereby rotating the assembly. The jet bores 65, of course, may be positioned to rotate the spool 21 in either direction as desired, without substantially altering the efficiency of the valve.

Again referring to Figure 3, the right end of the valve body 10 is enclosed by a cap assembly 67 having a threaded portion 69 adapted to screw into the threaded portion of the return chamber 15 and abut the shoulder 80 of the valve sleeve 25, thus securing the sleeve 25 in the body cylinder 16. A peripheral groove 81, retaining an O ring seal 82, extends around the exterior circumference of the cap 67 preventing external leakage. A bushing 84 is pressed into an axial bore 85 in the cap 67, and the outer end of the bushing 84 has a counter bore 86 to receive an O ring seal 87 adapted to admit and seal an idler rod 88 which extends therethrough.

The left cap assembly 89 slidably fits into and encloses the left return chamber 14 and is locked into place by an internal nut 90 screwed into the threaded portion 90a of return chamber 14. The inner end of the cap 89 has an annular groove 91 extending around the outer periphery thereof and an O ring seal 92 is retained therein to prevent external leakage. A bushing 94 is pressed into an axial bore 95 in the inner chamber 96 of the cap 89 and abuts a partition 97 which separates the inner chamber 96 from an outer chamber 99. A counter bore 100 on the inner end of the bushing 94 retains an O ring 101, and an idler rod 102 is admitted and sealed therethrough.

The outer chamber 99 of the cap 89 is cylindrically contoured to receive the enlarged barrel portion 105 of idler rod 102, having an elongated transverse bore 107 through its section adapted to receive an idler pin 104. The idler pin 104 extends through a pair of opposed bores 106 in the cylinder section of the cap 89 and fastens the idler rod 102 therein. The length of the elongated bore 107 in the idler rod 102 should be accurately determined to limit the axial movement of the valve spool 21.

The idler rod 102 extends through the cap 89 and bushing 94 and enters the large end portion of end bearing coupling 56 and is attached therein by means of a coupling pin 109. The coupling pin bores 108 in the end bearing coupling 56 are undercut and the coupling pin bore 111 through the idler rod 102 is counter-bored on each side, allowing sufficient play between the coupling pin 109 and the attached elements to prevent the valve spool 21 from binding in the valve sleeve 25.

Idler rod 88 passes through the right cap 67 and bushing 84 to be connected into the end bearing coupling 40 by means of a coupling pin 110 extending transversely through end bearing coupling bore 112 and idler rod bore 114. End bearing coupling bore 112 and idler rod bore 114 are undercut and counter-bored respectively to prevent binding of the spool 21 as in the case of the right end as described above.

The exterior periphery of valve sleeve 25, as shown in Figures 3 and 7, is provided with pressure packings 120 and O rings 121, retained within groves 122 at each end thereof, preventing external leakage therein. Another set of grooves 124 inwardly of the pressure fluid grooves 125 at each end of sleeve 25 also retain pressure packings 120 and O rings 121, sealing pressure fluid grooves 125 off from the pressure inlet groove 128 provided around the center of the sleeve 25. The pressure inlet grove 128 is bored at spaced intervals around the circumference of the valve sleeve 25, providing pressure inlet ports 126 which admit pressure fluid to an inner chamber 127 between the valve spool 21 and valve sleeve 25 (see Figure 3). The pressure fluid is then distributed through the metering flow hole patterns 34 in the valve sleeve 25 in accordance with metering land positions and through valve spool ports 35 and into the inner valve spool bore 26 to be forced out the jet motor 24 and jet orifices 65.

Each set of metering flow holes 34, as shown in Figure 7, comprise a number of evenly spaced orifices 129 radially located in the fluid grooves 125 in a somewhat staggered fashion around the periphery of the valve sleeve 25. Each orifice 129 consists of a small drilled portion next to the interior cylinder 16 of the sleeve 25 and an outer-drilled portion facing the pressure groove 125. The flow holes 129 of each set 34 are staggered in the lengthwise direction of the sleeve 25 to provide a predetermined relationship between the valve spool 21 displacement and flow rate change. When the valve spool 21 is in neutral position, all of the flow holes in the pattern 34 are blocked with the exception of the two holes of each pattern which are the farthest apart and these are preferably bisected (as best shown in Figures 3 and 9), by the opposite edges of each respective metering land 32, so that a small neutral leakage value continuously exists to both sides of the hydraulic motor piston 130, as shown in Figure 9.

By making the metering lands 32 on the spool 21 just wide enough to cover the desired proportion of the metering flow hole pattern 34, and providing fluid pressure and return grooves 125 in valve sleeve 25, on opposite sides of each metering land 32, the same set of metering holes 34 is used to meter the fluid away from the hydraulic motor cylinder, as well as back into the hydraulic motor cylinder when the spool 21 is moved to the corresponding position. No idle flow patterns 34 exist during flow of the fluid in either direction, and all the flow takes place through the individual flow holes 129. Since the hole location in each pattern 34 is symmetrical about its center, a symmetrical fluid flow through the valve is obtained on each side of neutral (see Figure 9), and there is no difference in the response of the controlled surface in either direction.

In one preferred form, a pressure of 3,000 p. s. i. is used in the pressure inlet 11 and the bisected flow holes are proportioned to provide a pressure drop of 1,500 p. s. i. In consequence, there is in the neutral spool position, as shown in Figure 9, a preload of 1,500 p. s. i. on both sides of the motor cylinder piston, thus any alteration of the position of the control surface, other than by pilot control, is prevented.

Inasmuch as a strong shearing force can be exerted between the valve sleeve 25 and the valve spool 21 at the flow hole patterns 34, the possibility of jamming due to the entrance of small foreign particles therebetween is reasonably slight. It is wise, however, to harden the valve spool 21 and valve sleeve 25 surfaces to a Rockwell hardness of C-60 to C-65, for example, and a material having the same temperature coefficient of expansion is preferably used to avoid binding between operating temperatures of from −65° F. to 165° F. for example.

In operation of the valve, the jet motor 24 rotates the spool 21 continuously at all times and in all valve positions.

In Figure 8, the valve spool 21 is shown fully displaced to the right of neutral, and the flow of pressure fluid is directed through the set of metering flow holes 34 in line with cylinder operating port 19, and into cylinder chamber A actuating hydraulic motor piston 130 of hydraulic motor 131 to the left, which in turn forces fluid out of cylinder chamber B and through the set of metering flow holes 34 into return chamber 14, thence out pressure return outlet 12 to the reservoir (not shown).

In Figure 9, the valve spool 21 is shown in neutral position. Pressure fluid is present around the inner chamber 127 between metering lands 32. A portion of the pressure fluid is directed through the valve spool center ports 35 and out the turbine jet assembly 24, rotating the spool thereby. The balance of the flow is directed across the bisected metering flow holes 129 into return chambers 14 and 15, maintaining a substantially constant operating force thereby to both sides of the hydraulic motor piston 130 in the hydraulic motor cylinder 131 of equal value.

In Figure 10, the spool valve 21 is fully displaced to the left of neutral and the situation described in Figure 8 and above has reversed. The metering land 32 at the left has unblocked the set of metering flow holes 34 in line with supply port 17 directing the flow of pressure fluid to chamber B, moving hydraulic motor piston 130 to the right and forcing the fluid out of chamber A into right return chamber 15. The fluid is then returned to return chamber 14 through end slots of cap assembly 67 and return passages 20.

It thus will be seen that the valve spool 21 rotates constantly, irrespective of its position, as shown in Figures 8, 9 and 10, as long as pressure exists in the hydraulic circuit, providing a consistently low and substantially constant push-pull operating force at all times.

It is, therefore, apparent that the present invention, having a constantly rotating valve spool assembly, offers a number of decided advantages over conventional type metering valves.

While the present valve has been described as being ideally suitable for use in a control system for aircraft surfaces, it will be readily seen that the advantages of the invention, as described herein, can be of value in other uses. Such uses within the knowledge of those skilled in the art are deemed to be included within the scope of the appended claim.

While in order to comply with the statute, the invention has been described in language more or less specific as to structural features, it is to be understood that the invention is not limited to the specific features shown, but that the means and construction herein disclosed comprise the preferred form of several modes of putting the invention into effect, and the invention is, therefore, claimed in any of its forms or modifications within the legitimate and valid scope of the appended claim.

What is claimed is:

A hydraulic valve structure of the kind described, including: a valve body having a cylindrical bore and a return chamber connected to an outlet conduit; a valve spool mounted in the cylindrical bore and provided with an axial bore in communication with pressure fluid passages in said valve body; a part extending axially from the valve spool into said return chamber and provided with an axial bore communicating with the axial bore in the spool; a reaction motor mounted on said axially projecting part in said return chamber and provided with pressure fluid through the bores in the spool and axially projecting part; removable end caps closing each end of the bore in the valve body; pressure retaining bearings positioned in said end caps; rod elements supported for axial movement in said bearings and mounted co-axially with the valve spool; and anti-friction means within the bore of the valve body and connecting the rod element at one end of the valve body to the spool, and at the other end of the valve body connecting the rod element to the axially extending part on which the reaction motor is mounted.

WARDE L. PARKER.

References Cited in the file of this patent

UNITED STATES PATENTS

| Number | Name | Date |
|---|---|---|
| 623,152 | Herdman | Apr. 18, 1899 |
| 1,616,778 | Booth | Feb. 8, 1927 |
| 1,967,851 | Wilson | July 24, 1934 |
| 2,124,274 | Nichols | July 19, 1938 |
| 2,304,784 | Donaldson | Dec. 15, 1942 |
| 2,479,807 | Bertea | Aug. 23, 1949 |
| 2,521,289 | Gerst | Sept. 5, 1950 |
| 2,566,051 | Avery | Aug. 28, 1951 |
| 2,582,088 | Walthers | Jan. 8, 1952 |